United States Patent Office 2,702,603
Patented Feb. 22, 1955

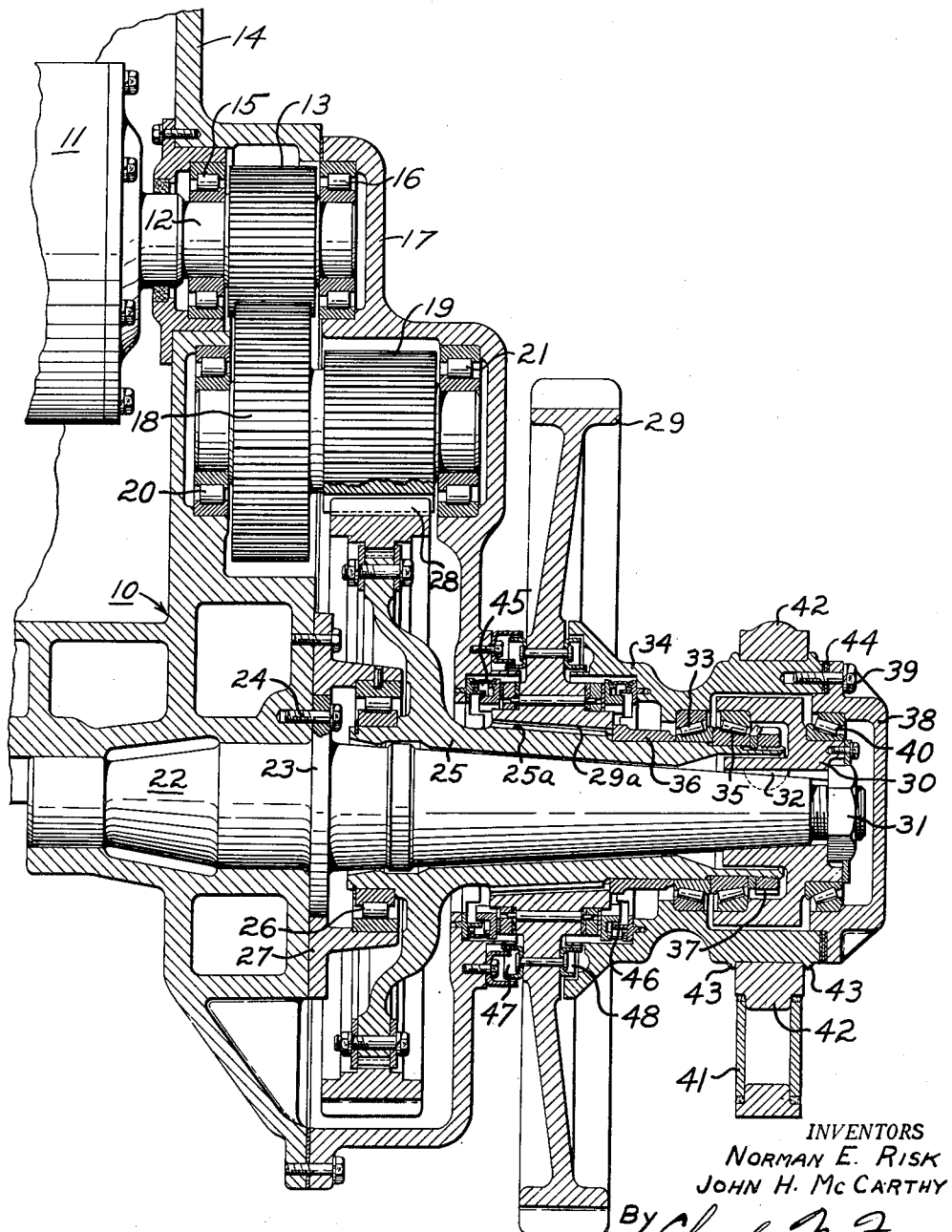

2,702,603

BEARING MOUNTING FOR TRACTOR DRIVING MEMBERS

Norman E. Risk and John H. McCarthy, Peoria, Ill., assignors to Caterpillar Tractor Co., Peoria, Ill., a corporation of California Application December 30, 1953, Serial No. 401,162

2 Claims. (Cl. 180—9.1)

The present invention relates to bearing mountings and particularly to the mounting for bearings used in conjunction with a nonrotatable shaft and a quill shaft supported for rotation, thereabout, as is common practice in the driving mechanism of certain track-type tractors.

While this invention may be employed in many fields, it is particularly useful in conjunction with driving assemblies for track-type tractors of the kind illustrated in Patent No. 2,022,651 for "Tractor" issued to Harmon S. Eberhard on December 3, 1935. The assembly shown in said patent is one in which a track driving sprocket is mounted on a quill driven by the power unit of the tractor and supported for rotation relative to a rigid and nonrotatable shaft. This invention is particularly concerned with the problem of misalignment of the quill-supporting bearings upon sprocket shaft deflection which occurs while the tractor is pulling or pushing extremely heavy loads.

One of the objects of the present invention, therefore, is the provision of a bearing mounting for the quill of the kind described in which bearing misalignment will be minimized during deflection of the sprocket shaft.

Another object of the invention is the provision of a combination bearing mounting for the driving sprocket quill of a track-type tractor and the nonrotatable sprocket shaft which combination may be preloaded by means of a common adjustment member.

A further object of the invention is the arrangement of the bearings and the sprocket retaining nut on the quill shaft of a track-type tractor so that the sprocket hub may be tightened on the quill without first removing the truck frame which is necessary in present constructions.

The drawing is a section in a vertical plane transversely of the sprocket showing the improved bearing mounting of the present invention as applied to the driving mechanism disclosed.

A final drive housing of the tractor is shown at 10 rigidly connected to the transmission case, not shown, and a steering clutch 11 is fastened to a short shaft 12, carrying an integral pinion 13. A wall 14 of the housing is apertured to receive the shaft 12 and a suitable bearing 15 therefore. A second bearing 16 is located in a cover member 17 rigidly secured to the housing. Pinion 13 meshes with a reduction gear 18 secured to a shaft having an integral pinion 19 and supported in the housing 10 and cover member 17 by bearings 20 and 21, respectively.

A sprocket shaft 22 extends through a portion of the housing and is rigidly secured thereto by means of a radial flange 23 and a plurality of cap screws as shown at 24. A quill 25 is disposed concentrically and out of contact with the shaft 22 and is supported at one end by a bearing 26 carried in a cage 27 secured to said housing portion. This quill carries a gear 28 which meshes with and is rotated by the pinion 19. The sprocket wheel 29 is also carried by the quill 25 and has a tapered hub portion 29A fitting a tapered and preferably splined surface 25A on the quill.

A recessed bearing holder 30 is secured on the outer end of the shaft 22 by a nut 31 and held against rotation by a key 32. A tapered roller bearing 33 carried in an outer housing member 34 cooperates with another tapered roller bearing 35 having an oppositely inclined race and carried by the holder 30 to support the outer end of the quill 25. The inner races, or cones of these bearings are retained in a fixed, spaced relationship to the hub of the sprocket 29 by a spacer 36 and a nut 37 on the outer end of the quill. An outer housing cap 38 secured to the outer housing by cap screws 39 supports said housing on the holder 30 by means of another tapered roller bearing 40 the race of which is inclined in the same direction as bearing 35. The outer housing 34 is secured to the truck frame 41 by means of a clamping member 42 located between the flanges 43 of the outer housing. Bearings 33 and 40 permit the truck frame 41 to oscillate relative to the sprocket shaft 22 so that the truck frame can swing up at its forward end as the tractor passes over obstacles or uneven ground. If it should become necessary to tighten sprocket 29 on the quill 25, the cap 38, the nut 31, and bearing holder 30 are removed thereby permitting nut 37 to be tightened and urge sprocket 29 to the left on the tapered portion 29A to compensate for any wear which may have occurred in the splined connection between the sprocket and the quill.

Bearings 33, 35 and 40 are simultaneously and equally preloaded by the removal of shims 44 between the outer housing 34 and its cap 38 and by drawing down cap screws 39.

With the construction shown, bearing 26 provides radial support for the inner end of the quill 25. Bearings 33 and 35 cooperate to provide radial support for the outer end of the quill, and also cooperate with bearing 40 to give radial support to the end of the sprocket shaft 22.

Inward thrust of the quill is transmitted to the truck frame 41 through bearing 33, while the outward thrust of the quill is transmitted through bearings 35 and 40.

Inward thrust of the sprocket shaft 22 is transmitted to the truck frame through bearings 35 and 33, while outward thrust is transmitted through bearing 40.

Conventional spring loaded, diaphragm-type seal assemblies are disposed on both sides of the sprocket hub at 45 and 46 to prevent the escape of lubricant from the bearing area and also to prevent the entrance of foreign material. Entrance of foreign material is further prevented by labyrinth arrangements on both sides of the sprocket indicated at 47 and 48.

By the construction shown, whenever the tractor encounters a severe load, sprocket shaft 22 will tend to deflect in a horizontal plane and to create serious bearing misalignment if quill supporting bearings 33 and 35 were separated axially of the quill a great distance. Since these bearings are adjacent to each other and their supporting surfaces are closely spaced, a minimum of bearing misalignment will be caused by sprocket shaft deflection.

We claim:

1. In combination with a nonrotatable shaft positioned between a final drive housing and a truck frame of a tractor, a driving unit including a quill surrounding the shaft, a bearing between the quill and the final drive housing, an outer housing member surrounding the outer end of the quill, a recessed bearing holder fixed to the shaft, bearing support means for the quill comprising a pair of oppositely disposed tapered roller bearings one between the housing and the quill and the other between the bearing holder and the quill. an outer housing cap, an outer bearing carried in the cap and cooperating with said bearing support means to provide pivoted support for the shaft in the frame, and means to adjust the outer housing cap axially of the shaft to preload the cooperating quill and shaft supporting bearings simultaneously and equally.

2. In combination with a nonrotatable shaft positioned between a final drive housing and a truck frame of a tractor, a driving unit including a quill surrounding the shaft, a bearing between the quill and the final drive housing, an outer housing member surrounding the outer end of the quill, a recessed bearing holder fixed to the shaft, bearing support means for the quill comprising a pair of oppositely disposed tapered roller bearings, one of which is carried in the outer housing member, the other carried in the bearing holder, an outer housing cap, an outer bearing carried in the cap and cooperating with said bearing support means to provide pivoted support for the shaft in the frame, and means to adjust the outer housing cap axially of the shaft to preload the cooperating quill and shaft supporting bearings simultaneously and equally.

References Cited in the file of this patent

UNITED STATES PATENTS

| | | |
|---|---|---|
| 1,437,833 | Buckwalter | Dec. 5, 1922 |
| 2,022,651 | Eberhard | Dec. 3, 1935 |
| 2,391,002 | Baker et al. | Dec. 18, 1945 |
| 2,453,360 | Burks | Nov. 9, 1948 |
| 2,572,480 | Hoffman | Oct. 23, 1951 |
| 2,588,333 | Wilson | Mar. 4, 1952 |